Nov. 26, 1957  D. C. GREISEN  2,814,062
WINDOW WASHING DEVICE
Filed Feb. 18, 1954
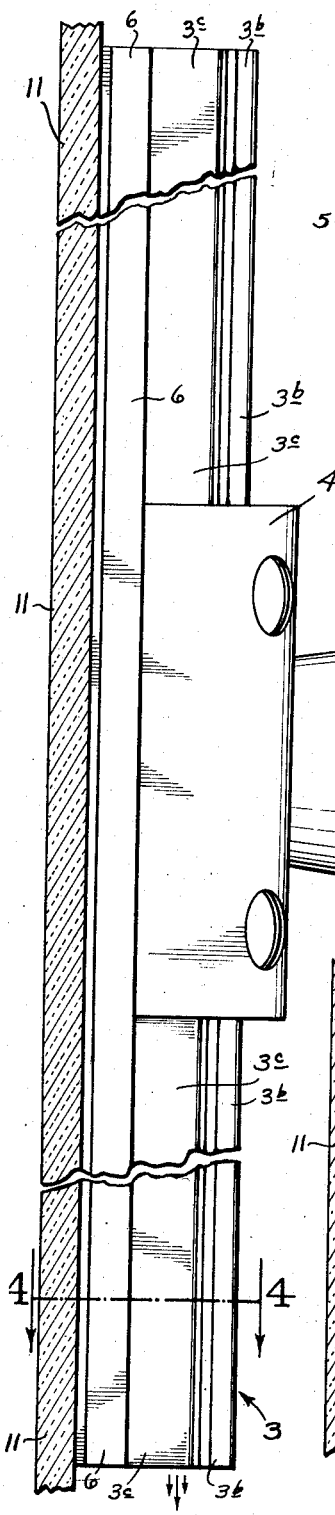
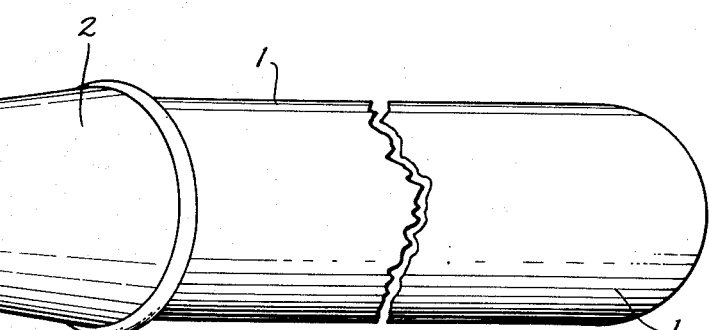
Fig. 2.  Fig. 3.
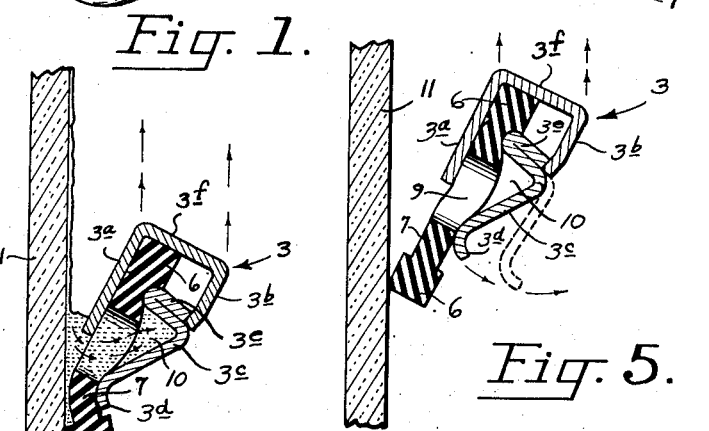
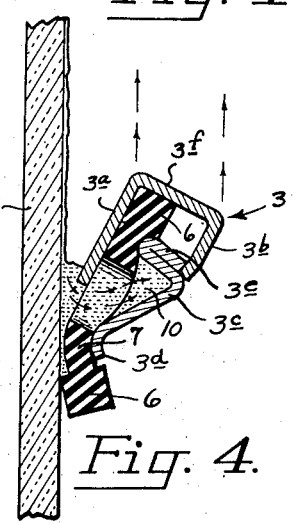
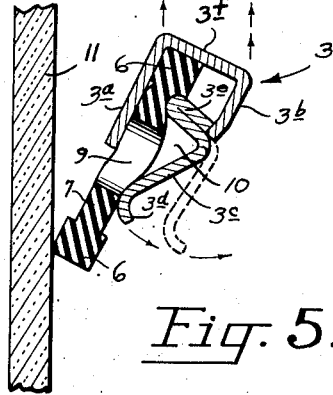
Fig. 1.
Fig. 4.  Fig. 5.
INVENTOR.
Denver C. Greisen
BY
Atty.

United States Patent Office 2,814,062
Patented Nov. 26, 1957

2,814,062

WINDOW WASHING DEVICE

Denver C. Greisen, Portland, Oreg.

Application February 18, 1954, Serial No. 411,123

8 Claims. (Cl. 15—245)

My invention relates to a new type of window washing device which is commonly referred to in the art as a "squeegee." A "squeegee" comprises a handle a clamp-type head arranged upon one end thereof and an elongated, flexible strip of rubber gripped by said head. At the present time there are two general types of rubber blades used with such devices. One has a heavy shoulder or bead along one longitudinal edge thereof with which the clamping head engages and this bead or shoulder tends to prevent the rubber from being laterally displaced in said clamping head. Another type of wiper blade is of uniform thickness and it is tightly clamped to prevent its lateral displacement.

One of the principal objects of my invention is to provide a window wiper and a blade therefor which will present multiple faces which may selectively be used either to remove the bulk of the water from a window to be wiped or to produce the final finishing touches for removing any slight traces of water which are left upon a window. To this end, I provide a window wiper blade made of rubbery material which resembles, in section, an I-beam. The marginal edges have rectangular bead-like shoulders formed thereon which shoulders terminate in four square corners. By providing both lateral edges of a wiper blade with such a rectangular shoulder, and by making them both shoulders with square corners, I may utilize any edge of said wiper blade selectively. Each edge is capable of wiping off the bulk of the water or may be used to produce the finishing wiping action in which slight residual moisture is removed.

Essentially, a window wiper of this character depends upon line contact of an edge of the wiper blade with the window or other surface to be wiped dry. If the wipers are initially provided with square corners they become rounded in use and thereafter are no longer capable of producing such line contact. Continued use increases the area of contact with a window to be wiped and such increased area does not strip a film of water from the window with as much facility as does one in which the corners are square and in which line contact is maintained. A professional window washer carries a wiper or so-called "squeegee" upon an extensible handle which is usually jointed to vary the length of his effective reach. When a long handle is used, he normally stands fairly close to the window and thus a relatively small angle is subtended between the vertical window and the angle of the handle. This causes the wiper blade to flex and presents the flat face of the wiper blade to the window. This will sweep off much of the adhering water and foreign substances to be removed. It is not too effective, however, to remove all of the water therefrom. He then commonly moves out from the window and increases the subtended angle. Thus, with a lighter pressure and a greater angle, he is able to use a corner to produce such line contact and to brush the window lightly so that even the last traces of water are removed therefrom. In a window wiper using a blade involving my invention, it is possible to use the relatively square shoulder portions, each of which is provided with plural sharp corners, first to use the corner lying inwardly from the peripheral edge to wipe off the major portion of the water from the window. Such corner spaced from the peripheral edge thus presents line contact with said window. Thereafter, the peripheral corner of said shoulder may be used for putting on the final finishing touches. In either event, the wiper blade presents square corners and maintains line contact with the window to increase the effectiveness of the wiping action. The amount of work done by each of said corners is thus distributed and each corner is thus worn less than if a lesser number of corners were provided. By providing rectangular shoulders on both edges of the wiper blade and by reversing said blade, this may be further distributed over eight corners.

A further object of my invention is to provide a window wiper and a blade therefor, which permits the water to be physically lifted from the surface of the window being wiped so that the water thus removed will not be permitted to drip down upon portions of the window lying below the area being wiped. This is accomplished by reason of the fact that said shoulders are arranged to be substantially wider than the central or intermediate web portion of the wiper blade and thus, water may collect upon the point of joinder of said web with the marginal shoulders. This lateral separation of water wiped from a window may be increased by making the intermediate or web portions of the wiper blade perforate to permit water to flow through said web and into the clamping head for the blade. Because of the angle at which a professional window washer operates, said handle is spaced further from the window surface than is the wiper blade and thus the water removed by the edge of the blade and flowing over the web portion thereof is permitted to fall into the clamping head and is discharged from the ends thereof. To this end, I preferably make the clamping head of such compass to cause it to overlie the perforations and to grip the wiper blade at both sides of the perforated portions. The clamping head is imperforate so that it defines a gutter in which the water will collect and will flow longitudinally to the end of the gutter where it will be discharged.

A further object of my invention is to provide a wiper blade and a holder therefor, which may easily, quickly and securely be joined together and with like facility be disassembled. To this end, I construct the clamping head of my approved window wiper of U-shaped form with an inturned marginal flange lying intermediate the margin of one of the legs of said clamping head. The head is preferably made of two pieces of material pivotally joined together. Said clamping head may readily be manipulated to facilitate the insertion and removal of a wiper blade without first loosening other auxiliary locking and releasing devices.

A further object of my invention is to provide a wiper blade and a holder therefor, which facilitates the gripping of said blade by a holder and prevents inadvertent lateral displacement of said parts. To this end, I preferably make the web portion of a wiper blade of elliptical section and of substantially thinner construction than the rectangular shoulder marginal edges thereof. Such elliptical section promotes flexibility and elasticity and yet promotes a wider edge of the point of joinder of the web with a marginal shoulder. Such construction also increases the area over which the clamping head may engage a wiper blade.

Other and further details of construction of my invention are hereinafter described with reference to the accompanying drawings, in which:

Figure 1 is an elevation of a window washing device embodying my invention in which the handle and head portion are shown foreshortened;

Figure 2 is a fragmentary portion of a wiper blade embodying my invention, said figure showing one end portion thereof;

Figure 3 is a sectional view through such wiper blade taken on the line 3—3 in Fig. 2;

Figure 4 is a sectional view taken on the line 4—4 in Fig. 1, illustrating the position of the wiper blade and its clamping head when the wiper is collecting the major portion of the water from a window; and Figure 5 is a view similar to Figure 4 illustrating the position and angle of said blade and its head when such device is used for completing the finishing touches upon a window, said figure illustrates further, in dotted outline and by arrows, the manner in which the clamping head may be flexed to accommodate the insertion and removal of a wiper blade.

A windshield wiper or so-called "squeegee" embodying my invention includes a handle 1. Such handle is usually jointed so that it may be extended or shortened to be used within a given reach. At the upper end is mounted a socket 2 which is preferably tapered so that the handle may be fitted tightly therein. A clamping head 3 is joined to the socket 2 by a mounting 4. Said socket 2, clamping head 3 and mounting 4 are preferably welded or otherwise securely joined one with the other. The clamping head 3 is preferably elongate and is of sufficient size to hold a wiper blade 5 of sufficient length to wipe an adequate swath over a window to be cleaned.

Said clamping head preferably is made of a sheet of metal and, as is illustrated in Figs. 4 and 5, it is preferably U-shaped. One leg 3a is flat and the other 3b engages an inturned clamping flange 3c that terminates in an outwardly curved gripping edge 3d. Said clamping flange is formed so that it tends to move toward leg 3a further than to the degree illustrated in Figs. 4 and 5. The legs 3a and 3b are joined by a connecting section 3f. The clamping flange 3c is preferably formed by folding its upper edge 3e back upon itself so as to be of double width. Said flange extends toward the leg 3a over half of the normal spacing of said legs. The clamping head is preferably made rigid so that it will perform said clamping function. The clamping flange is pivotally mounted so that it may be pulled outwardly, as is indicated in arrows and dotted lines in Fig. 5, to release its grip upon a wiper blade secured in said clamping head.

A wiper blade 5 embodying my invention and with which it is primarily concerned, comprises a pair of marginal shoulders 6 of rectangular form and terminating in four sharp corner edges 6a on each of the marginal shoulders. Said marginal shoulders are joined by an intermediate web portion 7 which is substantially thinner than the thickness of said shoulders, as is shown most clearly in Figure 3. The web portion is preferably of elliptical section. That is, it is thicker at its mid point than at the point of joinder 8 of said web with the two marginal shoulders 6. Extending across said web are a series of closely spaced, elongated holes 9. The longitudinal dimension of said holes spans the major portion of the width of the web. That is to say, as is illustrated in Fig. 3, the longitudinal dimension of said elongated holes covers substantially half of the width of said web and said holes span the longitudinal center line of said web. Said web at its mid point is substantially as thick as the marginal shoulder 6 but at the points of joinder 8 it is substantially thinner than the thickness of said shoulder. This thinning out of the web adjacent the point of joinder causes the portions of said shoulders adjacent the web to stand out laterally from the faces of the web so that the edge 3e of the gripping flange 3c may engage more securely with a marginal shoulder.

As is shown in Figs. 4 and 5, said edge 3e of the gripping flange tends to distort the wiper blade at the point due to the compression and displacement of the material. The corner where the leg 3a joins with the connecting section 3f is preferably square and the gripping of the edge 3e of the flange 3c pushes said shoulder into said corner and holds it tightly to inhibit lateral displacement in the clamping head. The leg 3a of the gripping head extends substantially parallel to the longitudinal center line of the wiper blade while the leg 3b extends beyond the furtherest end of the elongated holes 9. The curved gripping edge 3d, not only permits the wiper blade to flex as is shown in Fig. 4 without tending to cut or break said blade, but also provides a projection, as is shown in Fig. 5, which permits it to be engaged to release the clamping action of the edge 3e of the flange 3c upon one face of the wiper blade 5.

The additional length of the flange 3c over that of the leg 3a also performs another function. The gripping flange 3c is imperforate and overlies the elongated holes. The clamping head is preferably about as long as the wiper blade, as is shown in Fig. 1. Said gripping portion 3c being imperforate and projecting laterally at an oblique angle, provides a virtual gutter 10 bounded by the inner faces of the gripping portion 3c, its flange 3e and the adjacent face of the web portion 7 of the wiper blade 5. This is shown diagrammatically in Fig. 4. Thus, when the parts are arranged as shown in Fig. 4, and the wiper blade is performing an upward sweep, water upon a pane of glass or window 11 is swept through the holes or apertures 9 and flows into said gutter where it is discharged from the ends thereof. That is, the water being wiped from said window flows laterally away from the window and is spilled out at a point laterally distant from the wiped surface of said window and thus does not flow down over the window and re-wet it.

As is shown in Fig. 5, when a wiper is used to put the finishing touches upon a window, little moisture is wiped therefrom and usually there is an insufficient amount to collect and flow through said elongated holes or apertures 9. Said holes or apertures 9 thus function only when large quantities of water are to be wiped from a window. Thus, if only small amounts of water are left upon a window or if the wiping action is not vigorous, it is not essential to have said holes or apertures because they would serve no function.

A wiper blade may be inserted into the clamping head 3 by releasing the clamping portions from the leg 3b in the manner shown by arrows and dotted lines in Fig. 5. When the clamping head is thus relaxed, a wiper blade may be inserted or removed longitudinally of the clamping head wtih little restriction. To lock a wiper blade in place, it is necessary merely to push curved gripping edge 3d and it will move the clamping portion 3c back to the position shown in full lines in Figs. 4 and 5.

A window wiper embodying my invention is used as follows: Professional window wipers usually wipe with a downward sweep upon large plate windows such as in store fronts, but when washing other smaller window, they wipe with a so-called "figure 8" movement in which the longitudinal dimension is horizontal. In Figs. 4 and 5 an upward or sidewise sweep is being illustrated, but it is to be understood that this is only for the purpose of illustration. When a wiper blade is properly inserted in the clamping head as illustrated in said figures, it is usable in any one of four different directions. If a large amount of water is to be removed it is flexed as is shown in Fig. 4, and there the corner spaced from the marginal edge is used to provide line contact with the window. A lighter touch will present the corner at the marginal edge as is illustrated in Fig. 5. Similarly, the other two corners of the wiper blade may be used to remove water from a window. When said four corners are worn and rounded so as to be relatively inefficient, the blade may be turned over and the shoulders on the other margin of the wiper blade may be used and the worn end may be arranged within the clamping head and gripped by the flange 3e bearing upon the point of joinder and pushing said blade into the corner as illustrated in Figs. 4 and 5.

As is shown in Fig. 5, there is some slight grip effected between the outwardly curved gripping edge 3d and the extremity of the leg 3a, which grip deforms the wiper blade. This not only aids in a firm grip engaging the wiper blade with the clamping head, but also tends to stiffen it somewhat so that the marginal shoulder, which is being used to wipe away water, will be held more tightly against the window or pane of glass to be cleaned. This is augmented somewhat by the outward curvature of the gripping edge 3d when it is used as illustrated in Fig. 4. This tends to apply localized pressure at a point adjacent the point of joinder of the web 7 with said marginal shoulder. The light grip of the wiper blade effected between the edge 3d and the lower extremity of 3a moves away from said point of joinder when only a light finishing touch is being applied to said window as is shown in Fig. 5. This promotes the resiliency of said blade and permits a more uniform application of force of the corner of the shoulder in producing said finishing touches to a window.

It is my experience that with a wiper embodying my invention and particularly one using a blade having the general construction of that shown, that the eight corners, that is the four corners of each of the two marginal shoulders are worn substantially equally and thus, all eight of said corners are used to provide edge contact with a pane of glass by a professional window washer.

Although I have illustrated and explained my invention in connection with a so-called "squeegee" as used in window washing, it is not to be considered as its sole use. My invention also is usable, for example, in windshield wipers for automobile or other vehicles. I deem this use less valuable however, because most windshield wipers are supplied with some mechanical source of power and the pressure exerted and the angle at which they are mounted does not vary substantially except through change in velocity. That is to say, if one windshield wiper were set so that it would subtend an angle, such as for example in Fig. 5, the major portion of the wiping action would be done by the corner at the marginal edge of the wiper blade. If it were set closer to subtend an angle such as shown in Fig. 4, the major portion of the wiping would be done by the corner spaced from the margin of the blade. Said wiper blades usually are spring biased and if they are operated by so-called manifold vacuum, they do change in angle and pressure but generally speaking, they operate more or less at a uniform angle or uniform angles. In the hands of a window washer, however, said arrangement becomes more important and usable because the angle and pressure is varied by the window washer and the several corners may be selectively brought into play as the angle and pressure varies as he begin and ends the wiping of a window. It also varies in the type of stroke he uses. It is for these reasons that I feed that said window wiping device and the wiper blade have greater and different use in window washers, than in connection with windshield swipes.

I claim:

1. A wiper blade, comprising a relatively wide, thin and flexible elongate body of resilient material having the form of the capital letter I in cross section with the portion intermediate the two edges of the I being less thick than the edges themselves, at least one of said edges being of rectangular section, said edges defining two opposed faces each having a terminal corner and one spaced inwardly thereof, said intermediate portion of said blade having a degree of flexibility enabling either of the corners of a face to be brought into wiping contact with a plane surface to be cleaned, by varying the degree of flexure of said intermediate portion of said blade.

2. Claim 1 modified in that said intermediate portion of the blade is of generally elliptical section.

3. Claim 1 modified in that said intermediate portion of the blade is perforated to permit water wiped by said blade to pass therethrough.

4. Claim 3 modified in that the perforated portion of the blade is formed of a plurality of elongated apertures.

5. A window wiper having a handle, a clamping head joined to one end thereof and a resilient wiper blade mounted in said clamping head, said wiper blade comprising an elongate body having two marginal wiping edges each defined by a shoulder of rectangular section and an intermediate web of lesser thickness, said clamping head comprising a mounting for joinder with said handle and an elongated gripping member of generally U-shaped section including two spaced leg portions, one of said leg portions detachably carrying a separate wiper blade gripping element having an inturned flange, one end of said inturned flange being pivotally engageable with the inner portion of said one lag, the opposite end of said inturned gripping flange being pivotally movable into engagement with said wiper blade at the point where said intermediate web joins a rectangular shoulder defining a marginal edge of said wiper blade.

6. A window wiper having a handle, a clamping head joined to one end thereof and a resilient wiper blade mounted in said clamping head, said wiper blade comprising an elongate body having two marginal wiping edges each defined by a shoulder of rectangular section and an intermediate web of lesser thickness, said clamping head comprising a mounting for joinder with said handle and an elongated gripping member of generally U-shaped section including two spaced leg portions, one of said leg portions detachably carrying a separate wiper blade gripping element having an inturned flange, one end of said inturned flange being pivotally engageable with the inner portion of said one leg, said gripping member having an outwardly curved gripping edge for engaging the intermediate web of said wiper blade, and the opposite end of said inturned gripping flange being pivotally movable into engagement with said wiper blade at the point where said intermediate web joins a rectangular shoulder defining a marginal edge of said wiper blade.

7. A window wiper having a handle, a clamping head joined to one end thereof and a resilient wiper blade mounted in said clamping head, said wiper blade comprising an elongate body having two marginal wiping edges each defined by a shoulder of rectangular section and an intermediate web of lesser thickness, said clamping head comprising a mounting for joinder with said handle and an elongated gripping member of generally U-shaped section including two spaced leg portions, one of said leg portions detachably carrying a separate wiper blade gripping element having an inturned flange, one end of said inturned flange being pivotally engageable with the inner portion of said one leg, said gripping member having an outwardly curved gripping edge for engaging the intermediate web of said wiper blade the opposite end of said inturned gripping flange being pivotally movable into engagement with said wiper blade at the point where said intermediate web joins a rectangular shoulder defining a marginal edge of said wiper blade, said web being perforated by a series of apertures extending across the major portion thereof but terminating short of the point of joinder of said web and a rectangular shoulder, said gripping member being imperforate over the area thereof lying between the gripping flange and the outwardly curved gripping edge thereof and being of sufficient breadth to span the apertures in the wiper blade.

8. A window wiper having a handle, a clamping head joined to one end thereof and a resilient wiper blade mounted in said clamping head, said wiper blade comprising an elongate body having two marginal wiping edges each defined by a shoulder of rectangular section and an intermediate web of lesser thickness, said clamping head comprising a mounting for joinder with said handle and an elongated gripping member of generally U-shaped section including two spaced leg portions, one of said leg portions detachably carrying a separate wiper blade gripping element having an inturned flange, one end of said inturned flange being pivotally engageable with the inner portion of said one leg, said gripping element having an outwardly curved gripping edge for engaging the intermediate web of said wiper blade, the opposite end of said inturned gripping flange being pivotally movable into engagement with said wiper blade at the point where said intermediate web joins a rectangular shoulder defining a marginal edge of said wiper blade, said web being perforated by a series of apertures extending across the major portion thereof but terminating short of the point of joinder of said web and a rectangular shoulder, said gripping element being imperforate over the area thereof lying between the gripping flange and the outwardly curved gripping edge thereof and being of sufficient breadth to span the apertures in the wiper blade, said web of the wiper blade being of generally elliptical section.

References Cited in the file of this patent

UNITED STATES PATENTS

| | | |
|---|---|---|
| 353,863 | Kaelin | Dec. 7, 1886 |
| 2,039,716 | Horton | May 5, 1936 |
| 2,116,877 | Brown | May 10, 1938 |
| 2,566,294 | Siemund | Aug. 28, 1951 |
| 2,586,472 | McKown | Feb. 19, 1952 |